US012557740B2

(12) United States Patent
Houweling et al.

(10) Patent No.: US 12,557,740 B2
(45) **Date of Patent: *Feb. 24, 2026**

(54) GREENHOUSE AND FORCED GREENHOUSE CLIMATE CONTROL SYSTEM AND METHOD

(71) Applicant: Houweling Intellectual Properties, Inc., Camarillo, CA (US)

(72) Inventors: Casey Houweling, Delta (CA); Geurt Reinders, Almelo (NL)

(73) Assignee: Houweling Intellectual Properties, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 15/676,899

(22) Filed: Aug. 14, 2017

(65) Prior Publication Data

US 2017/0339848 A1 Nov. 30, 2017

Related U.S. Application Data

(63) Continuation of application No. 12/636,549, filed on Dec. 11, 2009, now Pat. No. 9,730,397, which is a continuation-in-part of application No. 11/824,159, filed on Jun. 28, 2007, now Pat. No. 8,707,617.

(60) Provisional application No. 60/817,755, filed on Jun. 29, 2006.

(51) Int. Cl.
*A01G 9/14* (2006.01)
*A01G 9/24* (2006.01)

(52) U.S. Cl.
CPC ............... *A01G 9/246* (2013.01); *A01G 9/14* (2013.01); *A01G 9/24* (2013.01); *Y02A 40/25* (2018.01)

(58) Field of Classification Search
CPC .................................... A01G 9/14; A01G 9/24
USPC .................................. 47/17, 19.2, 23.3, 29.5
See application file for complete search history.

(56) References Cited

U.S. PATENT DOCUMENTS

| | | | |
|---|---|---|---|
| 815,093 A | 3/1906 | Keeney | |
| 1,506,904 A | 9/1924 | Harrison | |
| 1,817,384 A * | 8/1931 | Lewis | F24F 3/044 |
| | | | 119/448 |
| 2,193,911 A | 3/1940 | Wright | |

(Continued)

FOREIGN PATENT DOCUMENTS

| | | |
|---|---|---|
| CA | 2592674 | 12/2007 |
| CA | 2592674 A1 | 12/2007 |

(Continued)

OTHER PUBLICATIONS

Intention to grant from corresponding European Patent Appl. No. 10 720 683.1-1655, dated Nov. 22, 2016.

(Continued)

*Primary Examiner* — David J Parsley

(74) *Attorney, Agent, or Firm* — Jaye G. Heybl; Stradling Yocca Carlson & Rauth

(57) ABSTRACT

A greenhouse is disclosed that generally comprises an enclosed growing section with an enclosed end gable adjacent to the growing section. The end gable is arranged to flow air into the growing section. Air distribution tubes are included within the growing section with the tubes arranged to provide for substantially uniform air flow into the growing section. The air tubes can also be arranged to compensate for heat differential between the air in the tubes and in the growing section.

18 Claims, 7 Drawing Sheets

(56) References Cited

U.S. PATENT DOCUMENTS

| | | | | |
|---|---|---|---|---|
| 3,124,903 A | * | 3/1964 | Truhan | A01G 9/246 |
| | | | | 47/17 |
| 3,274,730 A | | 9/1966 | Bose | |
| 3,289,567 A | | 12/1966 | Renner | |
| 3,348,922 A | | 10/1967 | Bose | |
| 3,404,618 A | | 10/1968 | Jacobs | |
| 3,520,244 A | * | 7/1970 | Gaines, Jr. | F16L 3/00 |
| | | | | 138/107 |
| 3,747,501 A | | 7/1973 | Honda | |
| 3,807,088 A | | 4/1974 | Jones | |
| 3,824,909 A | * | 7/1974 | Horneff | E04B 9/02 |
| | | | | 454/187 |
| 3,949,522 A | * | 4/1976 | Kehl | A01G 9/246 |
| | | | | 47/17 |
| 4,047,328 A | | 9/1977 | Kehl | |
| 4,163,342 A | | 8/1979 | Fogg | |
| 4,170,930 A | | 10/1979 | Lind | |
| 4,196,544 A | * | 4/1980 | Davis | A01G 7/045 |
| | | | | 47/17 |
| 4,290,242 A | * | 9/1981 | Gregory, Jr. | A01G 9/225 |
| | | | | 52/2.17 |
| 4,292,762 A | * | 10/1981 | Fogg | A01G 9/246 |
| | | | | 47/17 |
| 4,557,732 A | | 12/1985 | Hahnke | |
| 4,567,732 A | | 2/1986 | Landstrom | |
| 4,567,939 A | | 2/1986 | Dumbeck | |
| 4,586,342 A | | 5/1986 | Morishita | |
| 4,707,995 A | | 11/1987 | Assaf | |
| 4,718,130 A | | 1/1988 | Steinback | |
| 4,739,627 A | | 4/1988 | Baumann | |
| 4,916,642 A | | 4/1990 | Kaiser | |
| 5,001,659 A | | 3/1991 | Watabe | |
| 5,001,859 A | | 3/1991 | Sprung | |
| 5,101,593 A | | 4/1992 | Bhatt | |
| 5,212,903 A | | 5/1993 | Talbott | |
| 5,224,542 A | | 7/1993 | Hemsath | |
| 5,299,383 A | | 4/1994 | Takakura | |
| 5,315,834 A | | 5/1994 | Garunts | |
| 5,392,611 A | | 2/1995 | Assaf | |
| 5,493,808 A | | 2/1996 | Munday | |
| 5,553,417 A | | 9/1996 | Chambers | |
| 5,713,154 A | | 2/1998 | Goldstein | |
| 5,813,168 A | | 9/1998 | Clendening | |
| 6,006,471 A | | 12/1999 | Sun | |
| 6,578,319 B1 | | 6/2003 | Cole | |
| 6,705,043 B1 | | 3/2004 | Opdam | |
| 6,978,573 B2 | | 12/2005 | Van Der Heijden | |
| 7,228,657 B2 | | 6/2007 | Brault | |
| 8,707,617 B2 | | 4/2014 | Houweling | |
| 9,730,397 B2 | * | 8/2017 | Houweling | A01G 9/246 |
| 11,412,668 B2 | | 8/2022 | Houweling | |
| 2004/0194371 A1 | | 10/2004 | Kinnis | |
| 2005/0005510 A1 | | 1/2005 | Brault | |
| 2006/0021375 A1 | | 2/2006 | Wetzel | |
| 2008/0000151 A1 | | 1/2008 | Houweling | |
| 2010/0126062 A1 | | 5/2010 | Houweling | |

FOREIGN PATENT DOCUMENTS

| | | |
|---|---|---|
| DE | 3331284 | 3/1985 |
| DE | 3331284 A1 | 3/1985 |
| EP | 0517432 A1 | 12/1992 |
| EP | 0856709 | 8/1998 |
| EP | 1199922 B1 | 5/2002 |
| EP | 1464218 A1 | 10/2004 |
| EP | 1464219 | 10/2004 |
| EP | 1464219 A1 | 10/2004 |
| EP | 1598314 A1 | 11/2005 |
| FR | 2713317 | 6/1995 |
| GB | 693142 | 6/1953 |
| GB | 1242500 | 8/1971 |
| GB | 1242500 A | 8/1971 |
| GB | 2135442 | 8/1984 |
| GB | 2135442 A | 8/1984 |

| | | |
|---|---|---|
| JP | 2008304111 A | 12/2008 |
| NL | 6913348 A | 3/1971 |
| NL | 8200360 | 9/1983 |
| NL | 8200360 A | 9/1983 |
| NL | 9001674 | 2/1992 |
| NL | 9001674 A | 2/1992 |
| NL | 9001874 A | 3/1992 |
| NL | 200012 | 8/2002 |
| NL | 1021856 | 5/2004 |
| NL | 1021856 C2 | 5/2004 |
| NL | 1023053 | 10/2004 |
| NL | 1023053 C2 | 10/2004 |
| NL | 2000152 | 1/2008 |
| NL | 2000152 C2 | 1/2008 |
| NL | 1032779 C2 | 8/2008 |
| NL | 1037250 | 3/2011 |
| NL | 1038219 | 3/2011 |
| WO | 8000486 A1 | 3/1980 |
| WO | WO 1980000486 A1 | 3/1980 |
| WO | 8606928 | 12/1986 |
| WO | 8606928 A1 | 12/1986 |
| WO | 0076296 | 12/2000 |
| WO | 0076296 A1 | 12/2000 |
| WO | 03012344 | 2/2003 |
| WO | 2004032606 A1 | 4/2004 |
| WO | 2008002686 A2 | 1/2008 |
| WO | 2011028100 | 3/2011 |
| WO | 2012078927 | 6/2012 |
| WO | 2017210220 A1 | 12/2017 |

OTHER PUBLICATIONS

Second Office Action from Israeli Patent Appl. No. 227472, dated Oct. 25, 2015.

International Preliminary Report on Patentability from Appl. No. PCT/US2007/017083, dated Jan. 6, 2009.

Examination Report from European Patent Appl. No. 10 720 683.1-1655, dated Feb. 2, 2016.

Full Patent Examination Report No. Tre: AU 2010328690, dated Nov. 19, 2013,.

Letter from AA Thomton to EPO re: Response to EPO Summons to Oral Proceedings, Application No. 07810937.8, dated Sep. 25, 2015.

Letter from AA Thornton to EPO re: Opposition against EP2031957, dated Jul. 28, 2013.

Communication from EPO sending Minutes, Application No. 07810937. 8, dated Feb. 13, 2016.

Declaration of Mr. William Hunter in the matter of Patent Appl. No. 2010328690.

Statutory Declaration in the matter of Aus. Patent Appl. No. 2010328690.

Examination Report from Canadian Patent Appl. No. 2,777,694, dated Feb. 13, 2015.

Declaration of Jelle Schconderbeek and attachment.

W.J. Roberts, "Environmental Control of Greenhouses", Center for controlled Environment Agriculture, Cook College, Rutgers University, 19 pages.

"Semi-gesloten kas bokst op tegen woestijnklimaat" by Jelle Schoondereek.

"EuroFresh Tinkers With Greenhouse Design", by J. Benton Jones, Jr., www.growingedge.com.

First Office Action from corresponding Mexican Patent Appl. No. MX/a/2012/005610, dated Aug. 11, 2014.

Wayback Machine 2014 Calendar on http://www.borneroup.nl/ welcome/innovations; Date Downloaded Feb. 27, 2018.

Exhibit 1010 of the Complaint for Damages and Injunctive Relief for: Patent Infringement 35 U.S.C. § 271 for Case 2:16-cv-04291; Filed Jun. 15, 2016.

Exhibit 1002 Reisinger Figures; Dated Dec. 13, 2016.

Office Action from U.S. Appl. No. 12/636,549. dated Apr. 19, 2016.

Brief Description of Second Office Action from Israell Patent Appl. No. 227472, dated Oct. 25, 2015.

Onderglas, Klimmat/Verwarming. No. 12, Dec. 2006. Jaargang 3 Gesolten of semi-qesolten.

(56)                    References Cited

OTHER PUBLICATIONS

International Search Report From PCT/US2007/017083. Dated: Jan. 15, 2008.
Office Action dated Dec. 8, 2020 for U.S. Appl. No. 14/174,043 (pp. 1-17).
Case IPR 2017-00476 Exhibit 2023 of Environmentally friendly greenhouses in Camarillo impresses experts on http://archive.vcstar.com/business/environmentally-friendly-grecnhouscs-in-camanilo-impresses-cxports-ep-371888266-350864911.html; Dated May 15, 2009.
Brief Communication Letter from Opponent of 01.07.2020 to European Patent No. 2521436.
Brief Communication Lettre from Opponent of 12.4.18 to European Patent No. 2521436.
Brief Communication Copy of Intermediate Communication to European Patent No. 2521436.
Notice of Opposition to European Patent No. EP2521436. Mar. 27, 2018.
Office Action dated Jun. 9, 2021 for U.S. Appl. No. 14/174,043 (pp. 1-6).
Office Action dated Jul. 7, 2021 for U.S. Appl. No. 15/990,578 (pp. 1-15).
Translation of Mexican Office Action for App. No. MX/a/2018/001526, dated Oct. 14, 2021, 2 pages.
Brief Communication Letter from Opponent of Jan. 7, 2020 to European Patent No. 2521436.
Brief Communication Lettre from Opponent of Dec. 4, 2018 to European Patent No. 2521436.
Brief Communication Intermediate Communication to European Patent No. 2521436.
Letter to the EPO Boards of Appeal in the Opposition against European Patent No. EP2521436. Submitted Nov. 2, 2020. 10 pages.
Office Action (Non-Final Rejection) dated Nov. 23, 2021 for U.S. Appl. No. 14/174,043 (pp. 1-6).
Office Action (Final Rejection) dated Feb. 16, 2022 for U.S. Appl. No. 15/990,578 (pp. 1-16).
Office Action (Notice of Allowance and Fees Due (PTOL-85) dated Apr. 13, 2022 for U.S. Appl. No. 14/174,043 (pp. 1-8) .
Case IPR 2017-00476 Exhibit 2023 of Environmentally friendly greenhouses in Camarillo impresses experts on http://archive.vcstar.com/business/environmentally-friendly-grecnhouscs-in-camanllo-impresses-cxpcrts-ep-371888266-350864911.html; Dated May 15, 2009.
Case IPR 2017-00476 Exhibit 2022 of Innovation on http://www.houwelings.com/files-2/innovation.php; Downloaded Apr. 11, 2017.
Case IPR 2017-00476 Exhibit 2021 of the Response to Office Action for U.S. Appl. No. 11/824,159; Dated Jun. 21, 2013.
Case IPR 2017-00476 Exhibit 2020 of the Office Action for U.S. Appl. No. 11/824,159; Dated Mar. 15, 2013.
Declaration of Amy Candeloro for Case IPR 2017-00476; Dated Oct. 2, 2017.
Exhibit 2035 of Merriam-Webster's Collegiate Dictionary, Eleventh Edition for Case IPR 2017-00476.
Final Written Decision for Case IPR 2014-00309; Dated Mar. 23, 2014.
Exhibit 2033 for Case IPR 2017-00476, "The Snack: Dave's Specialty Produce"; dated Sep. 2017.
Exhibit 2032 for Case IPR 2017-00476, "The Packer: U.S. Grants patent for Ultra-Clima greenhouse system"; dated Feb. 26, 2014.
Exhibit 2031 for Case IPR 2017-00476, "Ventura County Star: Greenhouse design and patent bring fewer pests and more revenue to Houweling's Tomatoes"; Dated Apr. 19, 2014.
Case IPR 2017-00476 Exhibit 2019 of the Office Action for U.S. Appl. No. 11/824,159; Dated Nov. 12, 2010.
Case IPR 2017-00476 Exhibit 2018 of the Office Action for U.S. Appl. No. 11/824,159; Dated Mar. 25, 2010.
Case IPR 2017-00476 Exhibit 2017 of the Notice of Allowance for U.S. Appl. No. 11/824,159; Dated Jan. 30, 2014.

Case IPR 2017-00476 Exhibit 2016 of the Office Action for U.S. Appl. No. 11/824,159; Dated Sep. 25, 2013.
Case IPR 2017-00476 Exhibit 2015 of the Response to the Office Action for U.S. Appl. No. 11/824,159; Dated Aug. 30, 2013.
Case IPR 2017-00476 Exhibit 2014 of the Office Action tor U.S. Appl. No. 11/824,159; Dated Jul. 30, 2013.
Case IPR 2017-004/6 Exhibit 2013 of "Air Movement", Chapter 6, by Robert J. Downs and Donald T. Krizek.
Case IPR 2017-00476 Exhibit 2012; NJAES Research Greenhouse on Rutgers New Jersey Agricultural Experiment Station https://niaes.rutgers.edu/research-areenhouse/; Downloaded on April.
Case IPR 2017-00476 Exhibit 2011; Cornell University Agricultural Experiment Station Science for Life Greenhouses & Growth Chambers.
Case IPR 2017-00476 Exhibit 2010; Cornell University Greenhouses and Growth Chambers on https://cuaes.cals.cornell.edu/greenhouses; Downloaded on Apr. 11, 2017.
Case IPR 2017-00476 Exhibit 2009 ; Duke Trinity College of Arts & Sciences, Biology, Phytotron overview on https://bioloav.duke.edu/facilities/phYtotron; Downloaded on Apr. 11, 2107.
Case IPR 2017-00476 Exhibit 2008; NC State University Phytotron on https://phvtotron.ncsu.edu/; Downloaded Apr. 11, 2017.
Decision Denying Institution of Inter Partes Review 37 C.F.R. § 42.108 for Case IPR 2016-01309; Dated Dec. 15, 2016.
Decision Denying Institution of Inter Partes Review 37 C.F.R. § 42,108 for Case IPR 2016-00014; Dated Mar. 23, 2016.
Case IPR 2017-00476 Exhibit 2003 of the Oxford American Dictionary and Thesaurus with Language Guide edition 2003.
Declaration of Alexander Turkewitsch in Support of Patent Owner's Preliminary Response to Petition for Inter Partes Review for Case IPR 2017-00476; Dated Apr. 11, 2017.
Case IPR 2017-00476 Exhibit 1032; Bom Group; Third Party Observations in Opposition against European Patent EP2031957; Aug. 28, 2015.
Second Office Action for Israeli Application No. 227472; Dated Oct. 25, 2015.
First Examination Report from Corresponding New Zealand Application No. 611982; Dated Nov. 26, 2013.
Examiner Report on Canadian Application No. 2,620,897; Dated Jan. 16, 2015.
First Exam Report for New Zealand Application No. 705354; Dated Mar. 5, 2015.
Direction to Request Examination from Australian Application No. 2011338274; Dated Apr. 14, 2015.
Patent Examination Report for Australian Application No. 2011338274; Dated Sep. 22, 2015.
Final Written Decision tor Case IPR 2017-00476; Dated Jun. 6, 2018.
Videotaped Deposition of Alexander Turkewitsch for Case IPR 2017-00476; Dated Dec. 13, 2017.
Second Declaration of Merle H. Jensen, PH.D. for Case IPR 2017-00476; Dated Jan. 5, 2018.
Declaration of Martin Van Zeijl for Case IPR 2017-00476; Dated Mar. 1, 2018.
Exhibit 1028 of Pictures for Case IPR 2017-00476.
Exhibit 1027 Drawing from Turkewitsch Deposition for Case IPR 2017-00476.
Exhibit 1025 Picture for Case IPR 2017-00476.
Exhibit 1024 Figure for Case IPR2017-00476.
Exhibit 1023 Doorsnede Sunergiekas Figures P.L.J. Bom Groep for Case IPR 2017-00476.
Exhibit 1022 Figure for Case IPR 2017-00476.
Exhibit 1018 for Case IPR 2017-00476; Greenhouses Advanced technology for Protected Horticulture, by Joe J. Hanan; Dated Jan. 14, 1998.
Exhibit 1017 for Case IPR 2017-00476; Ecosystems of the World "20" Greenhouse Ecosystems, Copy 1; 1999.
Exhibit 1016 of the Response to the Office Action for U.S. Appl. No. 11/824,159; Dated Nov. 12, 2010.
Exhibit 1015 of the Appeal Decision of European Patent No. 2031957; Dated Jun. 27, 2016.
Exhibit 1014 of the Decision Revoking the European Patent for European Patent No. 2031957; Dated Feb. 15, 2016.

(56) References Cited

OTHER PUBLICATIONS

Exhibit 1012 of the Proceedings for European Application No. 07810937.8; Dated Feb. 15, 2016.

Exhibit 1011 of the Merriam Webster's Collegiate Dictionary, Tenth Edition; Dated 1997.

Benton Jones Jr., J. "EuroFresh Tinkers Wth Greenhouse Design", www.growingedge.com. May 26, 2014.

Declaration of Jelle Schoonderbeek and attachment. Nov. 25, 2013.

Observations by a third party from European Patent Application No. 10720683.1-1655/2521436. dated Feb. 6, 2014.

Official Action from corresponding European Appl. No. 201291033, dated Aug. 19, 2014.

Notice of Opposition from Australian Patent Appl. No. 2010328690, dated Aug. 15, 2014.

International Preliminary Report on Patentability for International Application No. PCT/US2007/017083. dated Jan. 6, 2009. 7 pages.

Examination Report from European Patent Appl. No. 10 720 683.1-1655, dated Feb. 12, 2016.

Brief Description of third Office Action from Israeli Patent Appl. No. 227472, dated May 3, 2016.

Notice of Allowance from Canadian Patent Office, Appl. No. 2,777,694, dated Aug. 4, 2016.

Office Action from Eurasian Patent Appl. No. 201291033, dated Aug. 1, 2016.

Document submitted in opposition proceeding, AU 2010328690, dated Nov. 8, 2015.

Opponent's Supplementary Outline in Response, AU 2010328690, dated Dec. 7, 2015.

Amendment Amending a Specification re: AU 2010328690, Oct. 22, 2015.

Patent Oppositions Letter re: AU 2010328690, dated Dec. 15, 2015.

Full Patent Examination Report No. 1 re: AU 2010328690, dated Nov. 19, 2015.

Declaration of Mr. William Hunter re: AU 2010328690, dated May 25, 2015.

Declaration of Ms. Bianca Capra re: AU 2010328690, dated Feb. 12, 2015.

Statutory Declaration of Mr. Hubertus Wilhelmus Albertus Dries re: AU 2010328690, dated Jul. 27, 2015.

Statutory Declaration of Dr. Emilie Sauret re: AU 2010328690, dated Jul. 27, 2015.

Houweling Decision re: Upholding Patent, AU 2010328690, dated Feb. 12, 2016.

Houweling Outline of Submissions re: AU 2010328690, dated Nov. 16, 2015.

Article "Evaporative Cooling for Greenhouses", Paassen, et al. Diest voor Landbouwkundig Onderzoek: Instituut voor Merchanisatie Arbied en Gebouwen (IMAG-DLO), Wageningen. Technische Universiteit Delft (TUD Koudetechniek/klimaatregeling), Delft. Undated. Article in English and German.

Communication from EPO re: Third Party Observations, Application No. 07810937.8, dated Feb. 10, 2015.

Letter from Opponent/Cramwinckel Consultancy/J.M. van der Hoeven to EPO re: Opposition Division, Application No. 07810937.8, dated Oct. 16, 2015.

Submission in Opposition Proceedings from EPO listing documents, Application No. 07810937.8, Sep. 25, 2015.

Letter from AA Thornton to EPO re: Response to EPO Summons to Oral Proceedings, Application No. 07810937.8, dated Sep. 25, 2015.

Letter from AA Thornton to EPO re: Opposition against EP2031957, dated Jul. 28, 2015.

Letter from EPO to Nicholas South at A.A. Thornton re: Submission in opposition proceedings with document listed. Dated Jul. 28, 2015.

Communication from EPO to A.A, Thornton re: Oral Proceedings, Application No. 07810937.8, dated Oct. 16, 2015.

Communication from EPO sending Minutes, Application No. 07810937.8, dated Feb. 15, 2016.

Acknowledgment of Receipt EPO filing receipt re: Application No. 07810937.8, dated Jul. 28, 2015.

Communication from EPO to A.A. Thornton re: Observations by Third Party, Application No. 07810937.8, dated Sep. 7, 2015.

Acknowledgment of Receipt re: Opponent Submissions, Application No. EP07810937.8, dated Sep. 30, 2015.

EPO communication re: Revocation of EP patent, Appeal & Grounds of Appeal, dated Feb. 15, 2016.

Summons to Attend Oral Proceedings, Application No. 07810937.8, dated Jul. 17, 2015.

Official Action from Eurasian Patent Appl. No. 201291033, dated Oct. 27, 2015.

Notice of Allowance from corresponding Mexican Patent Appl. No. MX/a/2012/005610, dated Dec. 26, 2014.

First Office Action for Mexican Application No. MX/a/2012/005610; Dated Aug. 11, 2014.

Notice of Acceptance/First Examination Report from corresponding New Zealand Patent Appl. No. 599383, dated Aug. 16, 2013.

Intention to Grant for European Application No. 10 720683.1-1655; Dated Nov. 22, 2016.

Certificate of grant from corresponding Australian Patent No. 2010328690, dated Jul. 14, 2016.

Prosecution History of European Patent Application No. 07810937.8.

First Office Action from Israeli Patent Appl. No. 227472, dated Feb. 17, 2015.

First Office Action from Israeli Patent Appl. No. 220017, dated Oct. 25, 2015.

Office Action from corresponding Eurasian Patent Appl. No. 201291033/31, dated Mar. 28, 2016.

"Evaluation of an Experimental Greenhouse Film with Improved Energy Performance" by Simpkins, et al.

First Office Action from corresponding Israel Patent Application No. 193844. dated Aug. 16. 2011.

Further Office Action from Israel Patent Appl. No. 193844 dated Jul. 10, 2012.

Office Action for counterpart Canadian Patent Application No. 2,592,674 dated Sep. 29, 2011.

International Search Report for International Application No. PCT/US2007/017083. dated Jan. 15, 2008. 3 pages.

P.L.J. Bom Groep, Press information distributed at the Horti Fair Nov. 2, 2005. 5 pages.

Gabot.de webpage retrieved Dec. 10, 2005.

EnerDes "Invention of the Semi-Closed Greenhouse" retrieved Oct. 25, 2016 from http://enerdes.com/invention-semi-closed-greenhouse/.

International Preliminary Report on Patentability for International Application No. PCT/US2010/001374. dated Jul. 29, 2013. 4 pages.

Netherlands Patent Application No. 1037250 filed Sep. 3, 2009 on behalf of Priva B.V.

Record of Oral Hearing for Case IPR 2017-00476; Dated Mar. 13, 2018.

Patent Owner's Opposition to Petitioner's Motion to Strike Exhibits 2040-2043 for Case IPR 2017-00476; Dated Mar. 23, 2018.

Petitioner's Motion to Strike Exhibits 2040-2043 for Case IPR 2017-00476; Dated Mar. 16, 2018.

Petitioner's Supplemental Mandatory Notices for Case IPR 2017-00476; Dated Mar. 7, 2018.

Petitioner's Objections to Patent Owner's Evidence tor Case IPR 2017-00476; Dated Mar. 6, 2018.

Patent Owner's Reply to Petitioner's Opposition to Motion to Exclude Evidence for Case IPR 2017-00476; Dated Feb. 27, 2018.

Petitioner's Opposition to Patent Owner's Motion to Exclude Evidence for Case IPR 2017-00476; Dated Feb. 20, 2018.

Order Trial Hearing Under 37 C.F.R. 42.70 for Case IPR 2017-00476; Dated Feb. 10, 2018.

Patent Owner's Request for Oral Argument for Case IPR 2017-00476; Dated Feb. 6, 2018.

Patent Owner's Motion to Exclude Evidence for Case IPR 2017-00476; Dated Feb. 6, 2018.

Petitioner's Request for Oral Argument for Case IPR 2017-00476; Dated Feb. 6, 2018.

(56) References Cited

OTHER PUBLICATIONS

Order Denying Authorization for Motion to Strike and Request for Sur-Reply 37 C.F.R. 42.5 and 42.20 for Case IPR 2017-00476; Dated Jan. 31, 2018.
Notice of Filing of Jan. 23, 2018 Teleconference Transcript for Case IPR 2017-0076.
Patent Owner's Objections to Petitioner's Evidence Under 37 C.F.R. § 42.64 (b)(1); Dated Jan. 16, 2018.
Reply to Patent Owner's Response; Dated Jan. 8, 2018.
Petitioner's Notice of Deposition of Alexander Turkewitsch for Case IPR 2017-00476; Dated Nov. 27, 2017.
Petitioner's Objections to Patent Owner's Evidence for Case IPR 2017-00476; Dated Oct. 10, 2017.
Patent Owner's Opposition to Institution of Inter Partes Review for Case IPR 2017-00476; Dated Oct. 2, 2017.
Notice of Deposition of Merle H. Jensen, PH.D. for Case IPR 2017-00476; Dated Aug. 23, 2017.
Joint Stipulation of Extension of Time For Due Dates 1 and 2 for Case IPR 2017-00476; Dated Aug. 23, 2017.
Patent Owner's Objections to Petitioner's Evidence Under 37 C.F.R. § 42.64(b)(1) for Case IPR 2017-00476; Dated Jun. 30, 2017.
Scheduling Order and General instructions 37 C.F.R. § 42.5 for Case IPR 2017-00476; Dated Jun. 16, 2017.
Decision Granting Institution of Inter Partes Review 37 C.F.R. § 42.108 for Case IPR 2017-00476; Dated Jun. 16, 2017.
Petitioner's Supplemental Mandatory Notices for Case IPR 2017-00476; Dated May 26, 2017.
Patent Owner's Preliminary Response to Petition for Inter Partes Review for Case IPR 2017-00476; Dated Apr. 11, 2017.
Petitioner's Supplemental Mandatory Notices for Case IPR 2017-00476; Dated Apr. 4, 2017.
Patent Owner's Power of Attorney for Case IPR 2017-00476; Dated Feb. 27, 2017.
Patent Owner's Supplemental Mandatory Notices for Case IPR 2017-00476; Dated Feb. 27, 2017.
Notice of Filing Date Accorded to Petition and Time for Filing Patent Owner Preliminary Response for Case IPR 2017-00476; Dated Jan. 11, 2017.
Houweling Nurseries Oxnard, Inc.'s Mandatory Notices Pursuant to 37 C.F.R. § 42.8(a)(2) for Case IPR 2017-00476; Dated Jan. 5, 2017.
Petitioner's Power of Attorney in an Inter Partes Review for U.S. Pat. No. 8,707,617; Dated Apr. 29, 2014.
Petition for Inter Partes Review for U.S. Pat. No. 8,707,617; Dated Dec. 14, 2016.
Declaration of Amy Candeloro for Case IPR 2017-00476; Dated Feb. 27, 2018.
Opponents Observations in preparation to the Oral Proceedings for Application No. EP07810937.8; Dated Sep. 25, 2015.
Timeline for Innovations on http://www.bomeroup.nl/welcome/innovations/; Dated Feb. 27, 2018.
Wayback Machine 2014 Calendar on http://www.bomeroup.nl/welcome/innovations; Date Downloaded Feb. 27, 2018.
Final Written Decision 35 U.S.C. § 318(a) and 37 C.F.R. § 42.73 for Case IPR 2016-00594; Dated Aug. 24, 2017.
ExifPro image Viewer Home Screen on http://www.exifpro.com/ for case IPR 2017-00476; Downloaded on Feb. 6, 2018.
Patents Held on http://www.houwelings.com/files-2/patents.php; Downloaded on Oct. 2, 2017.
Horti Daily Worldwide exclusive patents for Houweling's semi-closed greenhouse on http://www.hortidaily.com/print.asp?id=6571; Published on Feb. 19, 2014.
Declaration of Alexander Turkewitsch in Support of Patent Owner's Opposition to Petition for Inter Partes Review for Case IPR 2017-00476; Dated Oct. 2, 2017.
Videotaped Examination of Merle H. Jensen, PH.D .; Dated Sep. 7, 2017.
Case IPR 2017-00476 Exhibit 2026 of European Publication No. EP 1 464 219 A1; Exhibit Dated Sep. 7, 2017.

Case IPR 2017-00476 Exhibit 2025 of the Sunergy Greenhouse—One Year of Measurements in a Next Generation Greenhouse; Exhibit dated Sep. 7, 2017.
Case IPR 2017-00476 Exhibit 2024 of Using Semi-Closed Green-houses to Maximize Production while Minimizing Inputs and Waste; Exhibit Dated Sep. 7, 2017.
Prosecution of EP Application No. 13184198.3, Extended European Search Report, Jul. 28, 2017.
Prosecution of EP Application No. 13184198.3, Exam Report, Jul. 16, 2018.
IPR2017-00476, *J.M. van der Hoeven B.V.* v. *Houweling Nurseries,* Paper 1—Petition for Inter Partes Review U.S. Pat. No. 8,707,617
IPR2017-00476, Dec. 14, 2016.
IPR2017-00476, *J.M. van der Hoeven B.V.* v. *Houweling Nurseries,* Paper 10—Decision Instituting IPR, Jun. 16, 2017.
IPR2017-00476, *J.M. van der Hoeven B.V.* v. *Houweling Nurseries,* Paper 18—Petitioner's Reply to Patent Owner's Response, Jan. 8, 2018.
IPR2017-00476, *J.M. van der Hoeven B.V.* v. *Houweling Nurseries,* Paper 33—Final Written Decision, Jun. 6, 2018.
IPR2017-00476, *J.M. van der Hoeven B.V.* v. *Houweling Nurseries,* Ex. 1001—U.S. Pat. No. 8,707,617, Dec. 14, 2016.
IPR2017-00476, *J.M. van der Hoeven B.V.* v. *Houweling Nurseries,* Ex. 1002—Declaration of Merle Jensen, Ph.D., Dec. 14, 2016.
IPR2017-00476, *J.M. van der Hoeven B.V.* v. *Houweling Nurseries,* Ex. 1003—EP1464219A1 (Reisinger), with certified English translation, Dec. 14, 2016.
IPR2017-00476, *J.M. van der Hoeven B.V.* v. *Houweling Nurseries,* Ex. 1004—U.S. Pat. No. 3,807,088 (Jones), Dec. 14, 2016.
IPR2017-00476, *J.M. van der Hoeven B.V.* v. *Houweling Nurseries,* Ex. 1005—US2005/0005510A1 (Brault), Dec. 14, 2016.
IPR2017-00476, *J.M. van der Hoeven B.V.* v. *Houweling Nurseries,* Ex. 1006—U.S. Pat. No. 4,916,642 (Kaiser), Dec. 14, 2016.
IPR2017-00476, *J.M. van der Hoeven B.V.* v. *Houweling Nurseries,* Ex. 1007—U.S. Pat. No. 4,707,995 (Assaf), Dec. 14, 2016.
IPR2017-00476, *J.M. van der Hoeven B.V.* v. *Houweling Nurseries,* Ex. 1008—US2004/0194371A1 (Kinnis), Dec. 14, 2016.
IPR2017-00476, *J.M. van der Hoeven B.V.* v. *Houweling Nurseries,* Ex. 1009—U.S. Pat. No. 4,567,732 (Landstrom), Dec. 14, 2016.
IPR2017-00476, *J.M. van der Hoeven B.V.* v. *Houweling Nurseries,* Ex. 1010 Complaint in *Houweling Nurseries Oxnard, Inc.* v. *Little Leaf Farms, LLC,* Case No. 2:16-CV-04291 AB (JEMx), Dec. 14, 2016.
IPR2017-00476, *J.M. van der Hoeven B.V.* v. *Houweling Nurseries,* Ex. 1011—Merriam-Webster's Collegiate Dictionary (10th ed. 1997), Dec. 14, 2016.
IPR2017-00476, *J.M. van der Hoeven B.V.* v. *Houweling Nurseries,* Ex. 1012—Minutes of oral proceedings in the EPO Opposition of EP2031957B1, dated Feb. 15, 2016, Dec. 14, 2016.
IPR2017-00476, *J.M. van der Hoeven B.V.* v. *Houweling Nurseries,* Ex. 1013—Reasons for the decision revoking EP2031957B1 in the EPO Opposition, dated Feb. 15, 2016, Dec. 14, 2016.
IPR2017-00476, *J.M. van der Hoeven B.V.* v. *Houweling Nurseries,* Ex. 1014—Decision revoking EP2031957B1 in the EPO Opposition, dated Feb. 15, 2016, Dec. 14, 2016.
IPR2017-00476, *J.M. van der Hoeven B.V.* v. *Houweling Nurseries,* Ex. 1015—Grounds of Appeal in Appeal No. T0957/16-3.2.04, dated Jun. 27, 2016 (without enclosures), Dec. 14, 2016.
IPR2017-00476, *J.M. van der Hoeven B.V.* v. *Houweling Nurseries,* Ex. 1016—Apr. 5, 2011 Request for Continued Examination in U.S. Appl. No. 11/824,159, Dec. 14, 2016.
IPR2017-00476, *J.M. van der Hoeven B.V.* v. *Houweling Nurseries,* Ex. 1017—Greenhouse Ecosystems, in 20 Ecosystems of Theworld (G. Stanhill & H. Zvi Enoch eds., 1999), Dec. 14, 2016.
IPR2017-00476, *J.M. van der Hoeven B.V.* v. *Houweling Nurseries,* Ex. 1018—Joe J. Hanan, Greenhouses: Advanced Technology for Protected Horticulture (1998), Dec. 14, 2016.
IPR2017-00476, *J.M. van der Hoeven B.V.* v. *Houweling Nurseries,* Ex. 1019—Library of Congress Online Catalog—Item Information (Full Record) for: Merriam-Webster's Collegiate Dictionary (10th ed. 1997), Served but Not Filed.
IPR2017-00476, *J.M. van der Hoeven B.V.* v. *Houweling Nurseries,* Ex. 1020—Library of Congress Online Catalog- Item Information

(56)                    References Cited

OTHER PUBLICATIONS (Full Record) for: Greenhouse Ecosystems, in 20 Ecosystems of the World (G. Stanhill & H. Zvi Enoch Eds., 1999), Served but Not Filed.
IPR2017-00476, *J.M. van der Hoeven B.V.* v. *Houweling Nurseries*, Ex. 1021—Library of Congress Online Catalog—Item Information (Full Record) for: Joe J. Hanan, Greenhouses: Advanced Technology for Protected Horticulture (1998), Served but Not Filed.
IPR2017-00476, *J.M. van der Hoeven B.V.* v. *Houweling Nurseries*, Ex. 1022—Cross-flow fan images, Jan. 8, 2018.
IPR2017-00476, *J.M. van der Hoeven B.V.* v. *Houweling Nurseries*, Ex. 1023—SunergieKas® technical drawings, Jan. 8, 2018.
IPR2017-00476, *J.M. van der Hoeven B.V.* v. *Houweling Nurseries*, Ex. 1024—Three-dimensional model of Bom's stand at the Horti Fair 2005, Jan. 8, 2018.
IPR2017-00476, *J.M. van der Hoeven B.V.* v. *Houweling Nurseries*, Ex. 1025—Photograph of Bom's stand at the Horti Fair 2005, Jan. 8, 2018.
IPR2017-00476, *J.M. van der Hoeven B.V.* v. *Houweling Nurseries*, Ex. 1026—Mar. 6, 2017 letter from Patent Owner's representative in the appeal of the EPO opposition, Jan. 8, 2018.
IPR2017-00476, *J.M. van der Hoeven B.V.* v. *Houweling Nurseries*, Ex. 1027—Drawing made by Mr. Turkewitsch at his deposition, Jan. 8, 2018.
IPR2017-00476, *J.M. van der Hoeven B.V.* v. *Houweling Nurseries*, Ex. 1028—Photographs of the Van der Lans SunergieKas® greenhouse, Jan. 8, 2018.
IPR2017-00476, *J.M. van der Hoeven B.V.* v. *Houweling Nurseries*, Ex. 1029—Declaration of Martin Van Zeijl, Jan. 8, 2018.
IPR2017-00476, *J.M. van der Hoeven B.V.* v. *Houweling Nurseries*, Ex. 1030—Second Declaration of Merle H. Jensen, PhD., Jan. 8, 2018.
IPR2017-00476, *J.M. van der Hoeven B.V.* v. *Houweling Nurseries*, Ex. 1031—Deposition of Alexander Turkewitsch, Dec. 13, 2017, Jan. 8, 2018.
IPR2017-00476, *J.M. van der Hoeven B.V.* v. *Houweling Nurseries*, Ex. 1032—Third Party Observations in the EPO opposition, dated Aug. 28, 2015, Jan. 8, 2018.
EPO Communication Pursuant to Article 94(3) EPC in counterpart European Patent Application No. EP 07810937.8 dated Nov. 10, 2011.

International Search Report and Written Opinion from counterpart application PCT/US2010/001374 mailed Aug. 24, 2010.
First Office Action from Mexican Patent Application No. MX/a/2007/008107 dated Dec. 15, 2012.
Examination Report for Canadian Patent Application No. 2,592,674, dated Jul. 18, 2012.
Second Office Action from Mexican Patent Application No. MX/a/2007/008107 dated Apr. 8, 2013.
Intention to Grant from European Patent Appl. No. 07 810 937.8, dated Jun. 10, 2013.
Bird & Bird Statement of Defense. Counterclaim and Deed with Exhibits.
Kim, et al., "Improving the Distribution of Temperature by a Double Air Duct in the Air-Heated Plastic Greenhouse", Journal of Bio-Environmental Control 13(3):162-166 (2004).
International Preliminary Report on Patentability from PCT/NL2010/000127, dated Mar. 6, 2012.
Onderglas, Klimmat/Verwarming, Nummer 12, Dec. 2006. Jaargang 3 Gesolten of semi-gesloten.
W.J. Roberts, "Environmental Control of Greenhouses", Center for controlled Environment Agriculture, Cook College, Rutgers University, Jun. 1997, 19 pages.
Schoondereek, J. "Semi-gesloten kas bokst op tegen woestijnklimaat".
Office Action issued in U.S. Appl. No. 15/990,578 issued Sep. 6, 2018.
Office Action issued in U.S. Appl. No. 15/990,578 issued Nov. 27, 2018.
Office Action issued in U.S. Appl. No. 15/990,578 issued Apr. 8, 2020.
Office Action issued in U.S. Appl. No. 15/990,578 issued Jul. 7, 2021.
Office Action issued in U.S. Appl. No. 15/990,578 issued Sep. 15, 2022.
Office Action issued in U.S. Appl. No. 15/990,578 issued Jul. 12, 2019.
Office Action issued in U.S. Appl. No. 15/990,578 issued Oct. 27, 2020.
Office Action issued in U.S. Appl. No. 15/990,578 issued Feb. 16, 2022.
Office Action issued in U.S. Appl. No. 15/990,578 issued Apr. 12, 2023.

* cited by examiner

GREENHOUSE AND FORCED GREENHOUSE CLIMATE CONTROL SYSTEM AND METHOD

This Application is a continuation of, and claims the benefit of, U.S. application Ser. No. 12/636,549 to Houweling, et al., filed on Dec. 11, 2009, which is a continuation-in-part of and claims the benefit of U.S. patent application Ser. No. 11/824,159 to Houweling, filed on Jun. 28, 2007, now issued as U.S. Pat. No. 8,707,617, which in turn claims the benefit of U.S. Provisional Patent Application No. 60/817,755, also to Houweling, filed on Jun. 29, 2006. Each of these applications are hereby incorporated herein in their entirety by reference.

BACKGROUND OF THE INVENTION

Field of the Invention

This invention relates to greenhouses and more particularly to climate control systems for greenhouses.

Background of the Invention

Greenhouses have been used for hundreds of years to grow different varieties of plants, including ornamental plants and fruit/vegetable producing plants. Greenhouses typically comprise a structure with a plastic or glass roof and frequently glass or plastic walls. The interior of the greenhouse can be heated by incoming solar radiation that warms the plants and soil therein. The closed environment of a greenhouse has its own unique requirements compared with outdoor production. Pests and diseases need to be controlled and irrigation is necessary to provide water. Of equal importance, greenhouses can also be arranged to compensate for extreme highs and lows of heat and humidity, and to generally control the environmental conditions such as the level of carbon dioxide ($CO_2$).

Different greenhouses have been developed to control the environmental conditions in a greenhouse. U.S. Pat. No. 5,001,859 to Sprung describes a method and structure for environmental control of plant growth in greenhouse conditions. The structure comprises a translucent stressed fabric shell on a base, with which to grow plants, the shell and base sealing the environment within the space against external environmental conditions. The temperature and relative humidity within the production areas are generally controlled by a microprocessor based series of spray systems, along with a furnace. The spray systems can lower the temperature in the space while at the same time increasing humidity, and the furnace can be utilized to increase the temperature within the space.

U.S. Pat. No. 5,813,168 to Clendening describes a greenhouse and a method for controlling the environment of the interior space of the greenhouse. The greenhouse includes an interior insulating panel and a movable exterior reflective panel capable of both insulating the interior of the greenhouse and reflecting sunlight into the interior. The greenhouse also includes a closed-system heat exchanger having a plurality of spaced water-impermeable water flow passageways through which water flows by gravitational forces and having a means for blowing air between the water flow passageways such that the air does not contact the water and such that the air is either heated or cooled by the water. In addition, the heat exchanger may include a water discharge and/or a gas discharge for the control of humidity and gas levels within the greenhouse. Finally, the greenhouse includes hydroponic plant beds disposed on top of the heat exchangers and hydroponic solution tanks along the outer interior walls of the greenhouse.

U.S. Pat. No. 5,212,903 to Talbot discloses a greenhouse for providing environmental control for growing plants comprising a frame defining a structure forming an interior region for holding plants. A flexible cover is positioned over the frame for providing a roof enclosure for the structure, and an elongate roller extends along the length of the structure secured to a lengthwise edge of the cover. A power source is coupled to the roller driving the roller about its longitudinal axis to retract or extend the cover relative to the frame. The greenhouse also includes a water distribution system that includes a distribution conduit with spaced-apart spray nozzles positioned adjacent the top interior of the greenhouse. A power drive system oscillates the conduit through a defined arc to distribute water downwardly to plants growing in the greenhouse. A timing means is associated with the power drive for delaying the return rotation of the conduit to ensure that the outside edges of the spray pattern will be watered evenly.

U.S. Pat. No. 7,228,657 to Brault et al. discloses a greenhouse having an exterior curtain wall structure formed by spaced tubular posts carrying external transparent panels and bottom non-transparent wall panels below a sill with the panels spanning the posts. A plurality of elongate benches is located within the interior at spaced positions along one side wall with the width of the benches being equal to the post spacing to form an expandable construction. Each bench has associated with it a respective air handling system for conditioning including a duct which is located partly under the respective bench and a fan in a fan housing at the side wall. From the fan a vertical duct section extends to a flexible tube extending over the bench. Air dehumidification, fogging, heating and cooling are provided in the duct under the bench. An alley is arranged along the opposite wall containing electrical controls mounted in cabinets forming panels for mounting in the span between posts.

European Patent Application No. EP 1 464 218 A1 discloses a method for growing crops arranged in a greenhouse that is closed off from the environment and wherein the climate is regulated and watering of the crop is controlled within by a watering device. The photosynthesis and yield of the crop is regulated by controlling, independent of the outside conditions, the $CO_2$ concentration in the greenhouse and the transpiration by regulation of the temperature and air movements around the crop. Air regulating means can be utilized such as partitions, screens and the like, and outlet openings for air at different heights near the crop are provided so that the climate near the crop, and in particular the microclimate near the leaves of the crop, can be regulated and monitored.

International Application No. PCT/NL2000/000402 (Publication No. WO 2000/076296) discloses a market garden greenhouse system in which plant products can be cultivated. The market greenhouse is closed in that it is substantially not provided with ventilating openings or ventilating windows that can be opened. The greenhouse comprises heat regulating means for regulating heat therein, with heat generating from solar energy and a heating system. The greenhouse can also comprise an air humidity regulating means and surplus heat is removed from the greenhouse to an aquifer in the summer.

SUMMARY OF THE INVENTION

One embodiment of a greenhouse according to the present invention comprises a growing section with an air or gas distribution system within said growing section. The distribution system comprises one or more conduits for distributing air or gas within the greenhouse with conduits carrying air or gas having different pressures along the length of the conduits. The conduits are arranged to provide substantially equal distribution of air or gas throughout the growing section.

One embodiment of a greenhouse air distribution system according to the present invention comprises a plurality of tubes to distribute air within a greenhouse. A system is included for providing a main air flow to the interior of at least one of the tubes, the air pressure within the tubes varying along its length. The tubes have holes to allow air to exit from the tubes with the holes formed to compensate for the pressure variations to allow the tubes to provide for a substantially uniform air distribution along their lengths.

Another embodiment of a greenhouse according to the present invention comprises an enclosed growing section with an enclosed end gable adjacent to the growing section. The end gable is arranged to flow air into the growing section. Air distribution tubes are included within the growing section with the tubes arranged to provide for substantially uniform air flow into the growing section. The air tubes can also be arranged to compensate for heat differential between the air in the tubes and in the growing section.

These and other aspects and advantages of the invention will become apparent from the following detailed description and the accompanying drawings which illustrate by way of example the features of the invention.

DETAILED DESCRIPTION OF THE INVENTION

Figure 1:
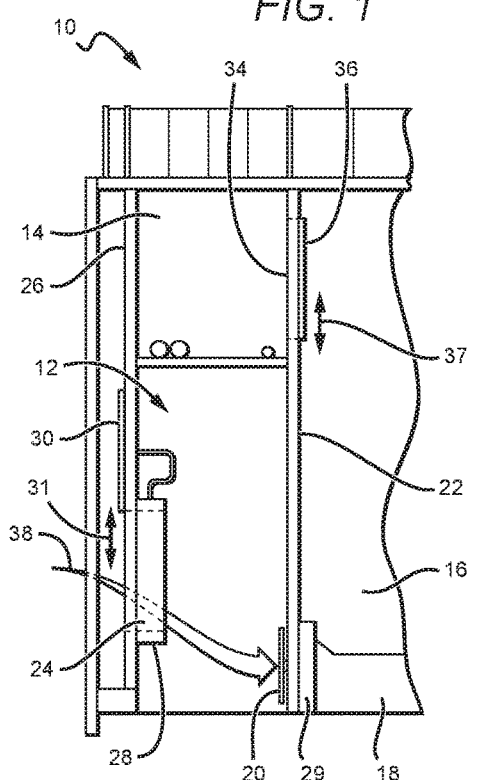
FIG. 1 is a side sectional view of one embodiment of a greenhouse and its climate control system according to the present invention.

The present invention generally relates to improved greenhouses and forced greenhouse climate control systems that are arranged to operate in different modes to control the temperature and environmental conditions within the greenhouse. In one mode ambient air is drawn into the greenhouse, and in other modes air from within the greenhouse is re-circulated. In still other modes, the system can draw ambient air in combination with recirculation of air, and when ambient air is drawn in, it can also be cooled. This arrangement provides for control of the greenhouse climate using a simple and cost effective system.

In one embodiment of a greenhouse and greenhouse climate control system according to the present invention, tubes are provided along the full length of the greenhouse growing section. Ambient and or re-circulated air is drawn into the tubes and each of the tubes has a means for allowing air to exit along its length, such as through holes along the length of the tubes. The number and size of holes is arranged to promote even distribution of air from the tubes throughout the greenhouse structure. It is understood that other devices can be used beyond tubes for flowing air into the greenhouse, and different means for allowing air to exit from the tubes can be used. The separation (spacing) between the tubes can vary and the diameter of the tubes can vary depending on the particular circumstances including but not limited to the surrounding climate, or crops being grown. In different embodiments the tubes can also be above the greenhouse crop or below gutters tables or other systems in the greenhouse.

Fans or other mechanisms for drawing air are arranged on the tubes to supply a flow of air volume to the tubes to cool the greenhouse during the expected elevated outside (external) temperatures and to heat the greenhouse during expected low temperatures. In one embodiment, a respective one of fans is located at one end of each of the tubes and flows air into and along the length of the tubes. It is understood, however, that the fans can be located in other positions on the tubes and a single fan can be used to flow air into more than one of the tubes.

The climate control system according to the present invention is also arranged to efficiently flow air of different temperatures into the tubes to control the temperature in the greenhouse during temperature cycles of the surrounding climate. When the temperature within the greenhouse rises, cooler gasses are provided to the greenhouse tubes, and in one embodiment the cooler air is provided from the ambient air outside the greenhouse. Systems can also be used to further cool the ambient air as it enters the greenhouse, if necessary. When the temperature in the greenhouse is at or near the desired level air from within the greenhouse can be circulated into the tubes. When the temperature within the greenhouse falls, known internal heater systems can be used to heat the air in the greenhouse with the heated air re-circulated to the tubes. To achieve the desired temperature within the greenhouse a controller can be employed to automatically provide for the different modes above or provide a combination of the modes. The systems according to the present invention can also control the pressure within the greenhouse and the level of certain gases such as carbon dioxide ($CO_2$).

Conventional greenhouse air distribution systems can distribute unequal amounts of gas along the length of the greenhouse. In the case of tubes provided along the length of the greenhouse, equally spaced perforations are provided along the tube to allow air or gas to pass from within the tube to the interior of the greenhouse. The air or gas is typically supplied to the tube from one end, and as a result of pressure differences and turbulence along the length of the tube, an unequal distribution of air can exit from the tube at different points along its length.

Another problem that may be encountered is a temperature difference over the length of the tube due to radiation and convection from or into the air tube, resulting in unequal temperatures. While still other challenges in providing homogeneous air distribution can result from air exiting the tube at an angle corresponding to the direction of air flow through the tube. In areas of turbulence, the air can emit at different directions from the holes, contributing to non-homogeneous air distribution along the tube.

As further described below, these problems can be minimized or eliminated by utilizing an air distribution system arranged according to the present invention. The distribution systems can be arranged to distribute equal amounts of air of a substantial homogeneous quality of the entire length of the greenhouse. In some embodiments the distance between perforations can be varied along the length to compensate for the pressure differences and turbulence. In other embodiments, the tubes can be arranged with compartments along its length that provide a barrier between the main flow in the tube and air exiting from the tube. This not only reduces the effects of the turbulence, but also provides and insulation barrier to reduce unequal temperatures along the length of the tube.

The present invention is described herein with reference to certain embodiments but it is understood that the invention can be embodied in many different ways and should not be construed as limited to the embodiments set forth herein. In particular, the present invention is described below in regards to greenhouse features arranged in a particular way but it is understood that these features can be arranged in different ways and can be used in other applications.

It is also understood that when an element or feature is referred to as being "on" or "adjacent" another element or feature, it can be directly on or adjacent the other element or feature or intervening elements or features may also be present. Furthermore, relative terms such as "outer", "above", "lower", "below", and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention.

Embodiments of the invention are described herein with reference to different views and illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein but are to include deviations in shapes that result, for example, from manufacturing.

FIGS. 1-4 show one embodiment of greenhouse 10 utilizing a forced greenhouse climate control system 12 according to the present invention. The greenhouse 10 has a gabled end 14 that is separated from the crop growing section 16 of the greenhouse by partition 22. The majority of the climate control system 12 is housed within the gabled end 14 with a portion of the system continuing into the crop growing section 16. The crop section 16 comprises a portion of the system comprising devices for distributing air from the gabled end 14 throughout the crop growing section 16. Many different distribution devices can be used, with a suitable device being a plurality of tubes 18 running the length of the crop section. As mentioned above, different numbers of tubes can be used with greenhouse 10 shown having five (5) tubes 18. The tubes 18 open through the partition 22 such that air from the gabled end 14 can flow into the tubes 18 and pass into the growing end through tube holes. Different numbers and sizes of holes can be included along the length of the tubes 18 to insure even distribution.

Fans 20 can be placed on or close to the bottom of the partition 22 between the gabled end 14 and the section 16 each at a respective one of the tubes 18. The fans 20 are arranged to pull or flow air into its respective one of the tubes 18 from in the gabled end 14. The air in the gabled end 14 can include ambient air from outside the greenhouse 10 or air from inside the crop section 16 during recirculation, or combination of the two. As more fully described below, this is accomplished by a louver and vent system within the greenhouse 10.

The greenhouse 10 further comprises a first vent/opening 24 ("first vent") in the outside gable wall 26 through which ambient air can enter the gabled end 14. The first vent 24 can be arranged in many different locations, with a suitable location as shown being on the lower portion of the outside gable wall. In the embodiment shown, one first vent 24 is shown, but it is understood that more than one vent can be included. The first vent 24 can be arranged in many different ways, with the preferred vent running substantially the length of the outside gable wall 26.

A cooling mechanism 28 can be included at the first vent 24 to cool air being pulled into the gabled end 14, and/or to control the humidity within the air. In one embodiment the cooling mechanism 28 is a conventional pad cooling system that is known in the art and not described in detail herein. A screen can also be included over the vent 24 to prevent insects and other pests from entering the greenhouse 10.

In some embodiments, a heat exchanger 28 can be included at or near the fans 20 to further heat or cool the air passing into the tubes 18. Heat exchangers are generally known in the art and the basic operation is only briefly discussed herein. According to the present invention, the greenhouse 10 can be arranged to store heated water from the heat exchanger for use in heating the greenhouse at a later time.

The heat exchanger 29 relies on a flow of water to cool air passing through the fan 20 as it enters the tube 18. The cooling of the air by the water passing though the heat exchanger can result in the warming of the water flowing through the heat exchanger. In some embodiments, this warmed water can be stored in a separate storage tank for later use in warming the air in the crop section 16. For example, warm water can fill the storage tank when the temperature of the air is high, such as during the day. The warmed water can be stored and at night, when the temperature dips, the warm water can be flowed into the heat exchanger 29 to warm the air passing into the tubes.

A first louver 30 can be included at the outside gable wall 26 that is movable in the directions of arrow 31 to control the amount of air entering the end gable 14. When operating in the mode to block air from entering the end gable 14 the louver is lowered to cover the first vent 24. When operating in the mode to allow air to enter the end gable 14, the louver 30 can be raised so that it is not blocking air from entering or can be partially raised such that it is partially blocking air from entering. As shown, the first louver 30 can be a planar shield that can slide down to fully or partially cover the first vent 24 depending on the desired amount of air to pass through the vent 24. It is understood that many different mechanisms can be used beyond the first louver 30 described above and the second louver described below.

The partition 22 comprises a second vent 34 that is located near the top of the partition 22, although the vent 34 can be in many different locations. A second louver 36 can be included at the partition 22 that operates similar to the first louver 30. The second louver 36 can be moved in the direction of arrow 37 to block air from entering through the second vent 34, or can be moved so that it is not blocking air from entering or is partially blocking air from entering. Like the first louver, the second louver 36 can be a planar shield that can slide down to fully or partially cover the second vent 34 depending on the desired amount of air to pass through the vent 34.

The crop section 16 of the greenhouse 10 can also comprise one or more conventional greenhouse vents (not shown) to allow excess air to be released from the greenhouse 10. This is particularly useful when ambient air is being drawn into the greenhouse. The release of air through the vents releases excess air that can build up in the crop section 16. These vents are generally known in the art and are not described herein. It is understood that these vents can also include screens to prevent insects from entering and the vents are preferably located at or near the greenhouse roof. In some embodiments, the vents can include fans to assist in the release of air, and it is understood that air can be released from the greenhouse using many different mechanisms beyond conventional vents.

In operation, when the air temperature within the crop section 16 rises it may be desirable to pull cooler air into the section 16. This is referred to as the cooling mode and is illustrated by the first air flow 38 shown in FIG. 1. The second louver 36 can be closed and the first louver 30 can be at least partially opened to allow air to pass through the first vent 24. Fans 20 can be activated to pull greenhouse ambient air through the first vent 24 and in those embodiments where additional cooling of the air is desired, the cooling mechanism 28 can be activated to cool the air pulled through the vent 24. The cooled air enters the gabled end 14 and is pulled into the tubes 18 by the fans 20. The cooled air is then distributed evenly throughout the crop section 16 through the holes in the tubes 18. The heat exchanger 28 can also contain a flow of water to further cool water entering the tubes 18. As additional ambient air is pulled into the greenhouse, excess air can be released from the greenhouse through roof vents.

Figure 2:
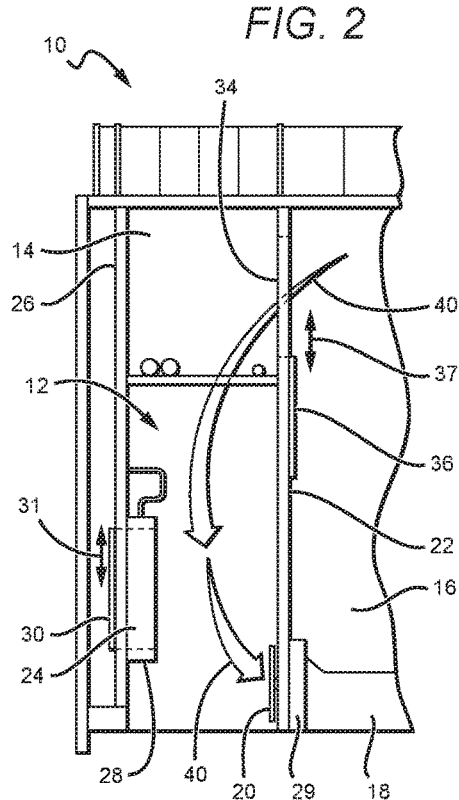
FIG. 2 shows the greenhouse climate control system in FIG. 1 showing another mode of air flow.
Figures 3, 4, 7:
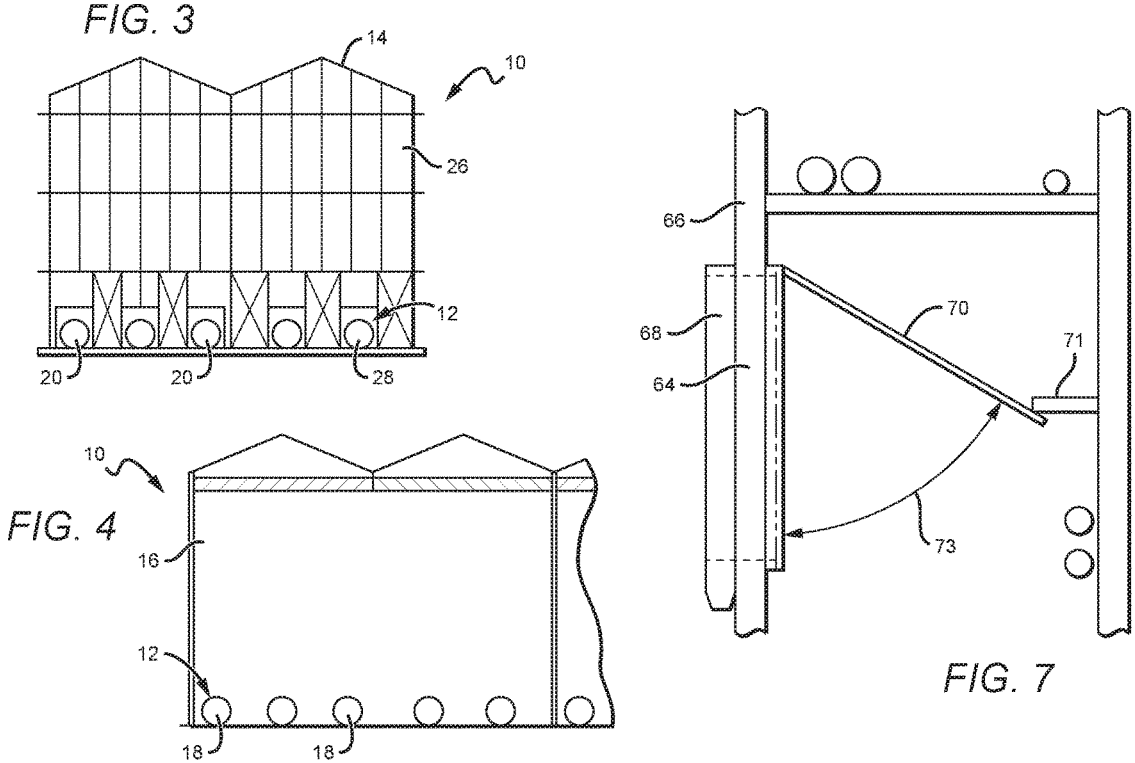
FIG. 3 is an end view of one embodiment of a greenhouse climate control system according to the present invention.
FIG. 4 is a sectional view of one embodiment of a greenhouse climate control system according to the present invention at the crop section of the greenhouse.
FIG. 7 shows the louver and first vent feature of the greenhouse climate control system in FIG. 5.
Figure 5:
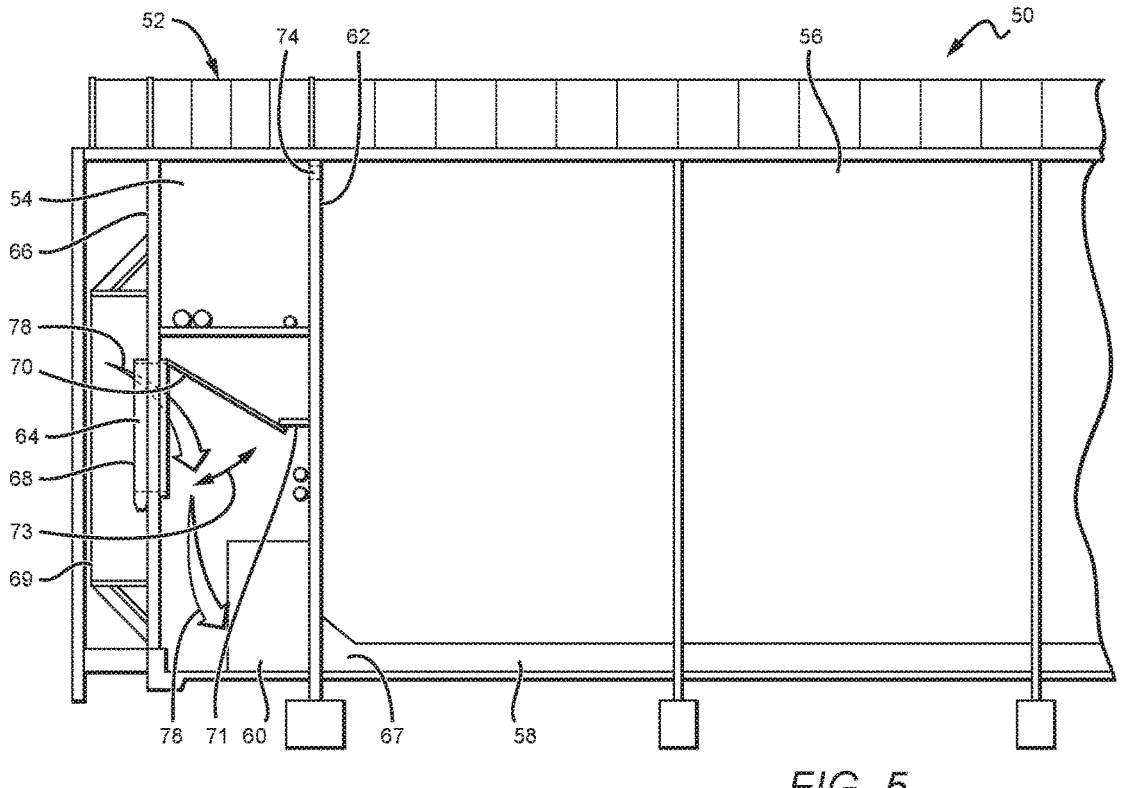
FIG. 5 is a side sectional view of another embodiment of a greenhouse climate control system according to the present invention showing one mode of air-flow.

When the air within the greenhouse is at the desired temperature or needs to be increased, the greenhouse enters the recycle mode as shown by second air flow 40 is FIG. 2. The first louver 30 can be closed and the second louver 36 opened. The fans 20 can then be activated to pull air from within the greenhouse section 16 into the gabled end 14. The air is then pulled into the tubes 18 and the air is distributed throughout the greenhouse through holes in the tubes 18. This circulation can continue as the temperature is maintained at its desired level. If the air needs to be heated, known heating systems can be employed within the greenhouse with one such system supplying heated water to rails or pipes in the greenhouse floor. Alternatively, heated water can be supplied to the heat exchanger 29 from the supply of heated water as described above. Air heated by this system can then be circulated until the desired temperature is achieved within the greenhouse 10. Alternatively, the growing section can rely on the heat generated from sunlight passing into the growing section through the transparent roof or sidewalls.

As mentioned above, the system 12 can also be operated to supply a combination of air to the tubes 18 from a combination of air flows 38 and 40. This can be accomplished by controlling the opening of the first and second louvers 30 and 36 while the fans 20 are operating. The fans 20, first and second louvers 30, 36 and the heat exchanger 29, are preferably operated under computer control using various known sensors and hardware/software combinations.

The greenhouse 10 and its forced greenhouse climate control system 12 provide for improved and cost effective control of the greenhouse climate compared to conventional systems. It is particularly useful in desert climates where it is useful to provide cost effective systems for minimizing the maximum heat experienced by crops within a greenhouse. For example, one embodiment of the greenhouse 10 can reduce what would typically be 33° C. temperature in greenhouse to 26° C. without employing expensive cooling systems. This reduction in temperature can have a dramatic impact on the improved health and growth of crops within the greenhouse.

Figures 9, 10:
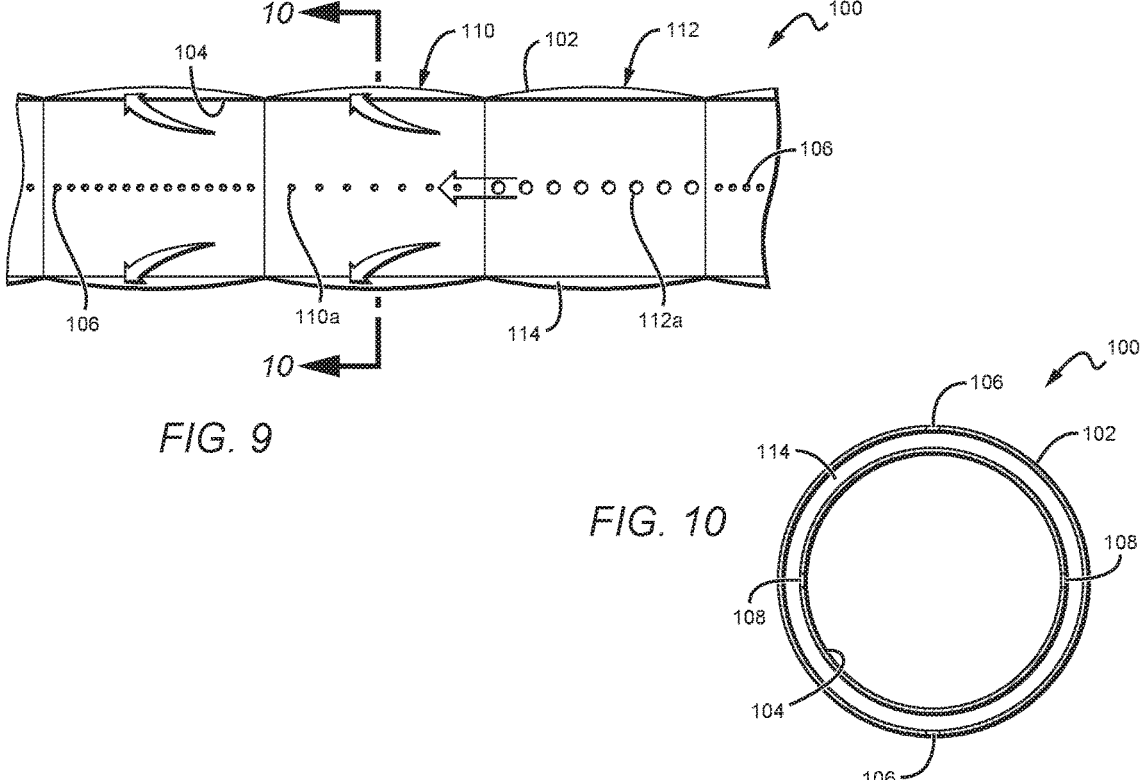
FIG. 9 is side view of one embodiment of an air distribution tube according to the present invention.
FIG. 10 is a sectional view of the tube in FIG. 9 taken along section lines 10-10.

FIGS. 5-8 show another embodiment of greenhouse 50 that is similar to the greenhouse 10 described above and shown in FIGS. 1-4. The greenhouse 50 also utilizing a forced greenhouse climate control system 52 according to the present invention. The greenhouse 50 has a gabled end 54 that is separated from the crop holding section 56 of the greenhouse 50 by partition 62. The crop section 56 comprises an air distributing device to distribute air from the gabled end 54 throughout the crop section 56. Many different distribution devices can be used, with a suitable device being a plurality of tubes 58 running the length of the crop section 56 similar to the tubes 18 in greenhouse 10. As mentioned above, different numbers of tubes can be used with greenhouse 10 shown having ten (10) tubes 58 as best shown in FIG. 10. Referring again to FIGS. 5 and 6 the tubes 58 open through the partition 62 such that air from the gabled end 54 can flow into the tubes 58.

Fans 60 can placed in or close to the partition 62 between. Each of the tubes 58 are connected to an opening in the partition lower portion of the partition 62. A respective fan 60 is then arranged over each of the openings and air from each of the fans 60 flows into its respective one of the tubes 58. The fans 60 are arranged with the ability to pull ambient air from in the gabled end into the tubes during operation. This can either be ambient air or re-circulated air, or combination of the two.

The greenhouse 50 further comprises a vent/opening ("vent") in the outside gable wall 66 through which ambient air can enter the gabled end 54. The vent 64 is similar to the opening 24 in greenhouse 10 described above but is located near the center of the gabled wall 66, as shown. The vent 64 preferably runs the length of the gabled wall and although one vent 64 is shown it is understood that more than one opening can be included.

A cooling mechanism 68 can also be included at the vent 64 to cool air being pulled in into the gabled end 54, and/or to control the humidity within the air. In one embodiment the cooling mechanism 68 is a conventional pad cooling system that also runs the length of and is included over the vent 64. A screen 69 can also be included over the vent 64 to prevent insects and other pests from entering the greenhouse 50. A heat exchanger 68 can also be included at or near the fans 60 that is arranged and operates similar to the heat exchanger 29 shown in FIGS. 1 and 2 and described above. The heat exchanger 68 can further heat or cool air entering the tubes 58 as described above.

A first louver 70 can be included inside of gable wall 66 that is movable in the directions of arrows 73 to control the amount of ambient air entering the end gable 54. When operating in the mode to block air from entering the end gable 54 the louver 70 is closed to cover the vent 64. When operating in the mode to allow air to enter the end gable 54, the louver 70 can be swing open so that it is not blocking air from entering or can be partially opened such that it is partially blocking air from entering. As the louver 70 swings from its closed and fully blocking position over the first vent/opening 64 it also blocks re-circulating air that would otherwise be pulled into the tubes 58 by the fans 60. The greenhouse further comprises a shelf 71 on the inside surface of the partition 62. When the louver 70 is fully opened its lower surface abuts the shelf 71 to fully block re-circulating air from being drawn by the fans 60. Instead, in this position the fans 60 draw primarily ambient air that can be cooled by cooling mechanism 68. It is understood that many different mechanisms can be used beyond the first louver 70 described above.

The partition 62 comprises a second vent/opening 74 that is located near the top of the partition 62, although the vent 74 can be in many different locations. Unlike the vent 34 described above in greenhouse 10, the vent 74 does not have a second louver and remains open through operation. The amount of air from the crop section 56 drawn through by the fans and re-circulated into the tubes is controlled by the extent to which the louver 70 is opened. If the louver 70 is fully closed all of the air drawn through the fans 60 comes through vent 74 for re-circulating. When the louver 70 is fully open no air through the vent is drawn by the fans. When the louver is at different positions between fully open and closed, the fans draw a combination of ambient and air through the vent 74.

The crop section 56 can also comprise one or more conventional greenhouse vents (not shown) to allow excess air to be released from the greenhouse 50. These vents are generally known in the art and are not described herein. The greenhouse vents are preferably located at or near the greenhouse roof and can include fans to assist in the release of air. It is understood that air can be released from the greenhouse using many different mechanisms beyond conventional vents.

The greenhouse 50 operates similar to the greenhouse 10. In operation, when the air temperature within the crop section 56 rises it may be desirable to pull cooler air into the section 56. This is referred to as the cooling mode and is illustrated by the first air flow 78 shown in FIG. 5. The louver 70 can be at least partially opened to allow ambient air to pass through the first vent 64. Fans 60 can be activated to pull ambient air through the vent 64 and in those embodiments where additional cooling of the air is desired, the cooling mechanism 68 can be activated to cool the air pulled through the vent 64. The cooled air enters the gabled end 54 and is pulled into the tubes 58 by the fans 60. The cooled air can be further cooled by heat exchanger 67 and the cooled air is then distributed evenly throughout the crop section 56 through the holes in the tubes 58. As additional ambient air is pulled into the greenhouse, excess air can be released from the greenhouse through roof vents.

Figure 6:
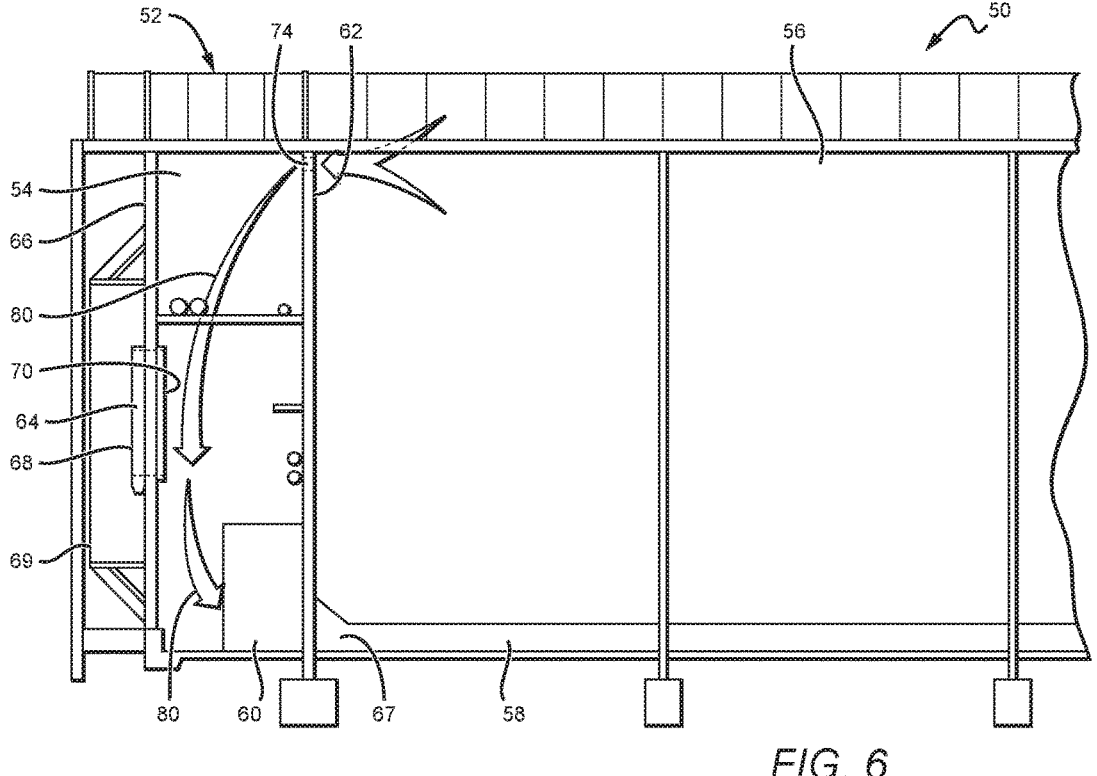
FIG. 6 shows the greenhouse climate control system in FIG. 1 showing another mode of air flow.
Figure 8:
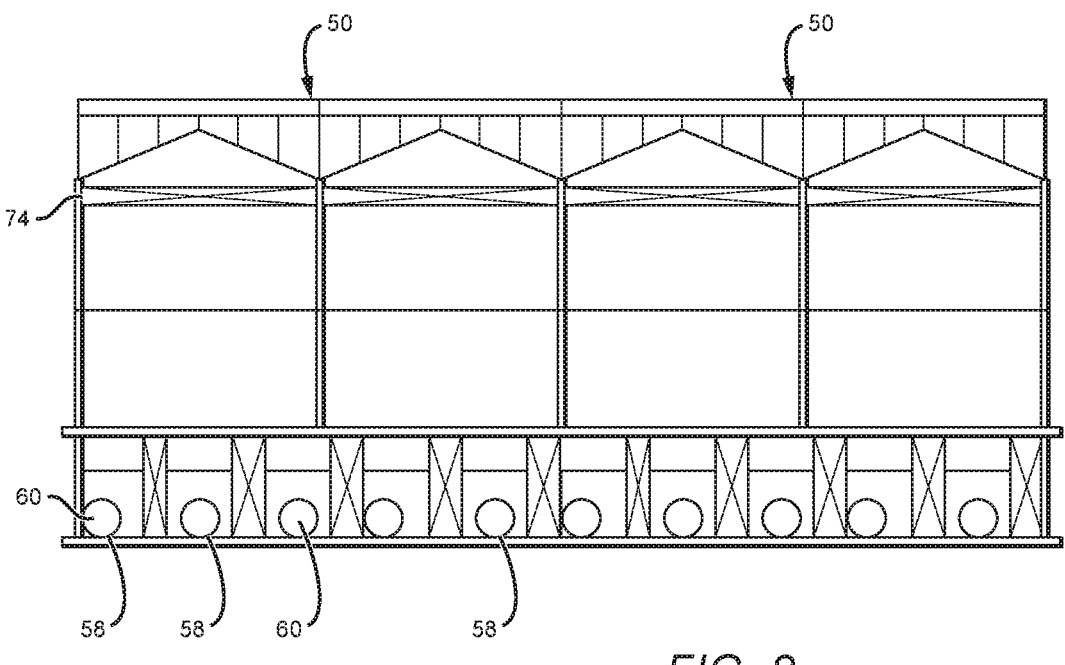
FIG. 8 is an end view of one embodiment of a greenhouse climate control system according to the present invention.

When the air within the greenhouse is at the desired temperature the greenhouse enters the recycle mode as shown by second air flow 80 in FIG. 6. The first louver 70 can be closed and the fans 60 can then be activated to pull air from within the greenhouse section 56 into the gabled end through the second vent 74. This circulation can continue as the temperature is maintained at its desired level. If the air needs to be heated, known heating systems can be employed within the greenhouse with one such system supplying heated water to rails in the greenhouse floor as described above. Alternatively, warm water can be supplied to the heat exchanger 68 from the separate heated water supply as described above with reference to heat exchanger 29. As ambient or recycled air passes through the fans 60 it is heated and passed into tubes 58. As the heated air exits the tubes it heats the air within the crop section. Air heated by this system can then be circulated until the desired temperature is achieved within the greenhouse 50.

As mentioned above, the system 12 can also be operated to supply a combination of air to the tubes 18 from a combination of air flows 78 and 80. This can be accomplished by controlling the opening of the louver 70 while the fans 60 are operating. Like the embodiment above, the fans 60, louver 70, heat exchanger 67 are preferably operated under computer control using various known sensors and hardware/software combinations.

It is understood that there are many additional advantages and alternative arrangements provided by the present invention. One advantage is that the crop section can be over-pressurized by the system 52, which can prevent undesired insects. The invention further provides for enhanced crop yields by allowing for greater levels of radiation to reach the plants by eliminating conventional roof vent superstructures and accompanying insect netting. The crop section 56 can also be arranged so that a gas, such as $CO_2$ can be fed into and more efficiently maintained within the section 56. The gas feed systems are known in the art and not discussed in detail herein. These gasses can further enhance the health and growth of the crop within section 56.

In alternative embodiments, the fans 60 can be controlled and operated as variable drive fans to provide additional control over air flow. The vents can be different sizes and more vents can be included in many different locations.

In still other embodiments, the greenhouse can be arranged without a gabled end. For example, the first louver can be arranged over the fans with the cooling mechanism located at the fans such that ambient air can be pulled directly into the tubes with the air passing the cooling mechanism for additional cooling. Pipes can be included and arranged to provide an air passageway between the second vent and the fans during the mode when air from within the crop section is to be recycled. This is only one of the many alternative arrangements for greenhouses and forced greenhouse climate control systems according to present invention.

As discussed above, one air distribution according to the present invention can comprise tubes running the length of the crop section of the greenhouse. It is understood, however, that the present invention can also comprise any other mechanism that can distribute air in a controlled fashion, including but not limited to different types of conduits. As mentioned above, in greenhouse 10 different numbers of tubes 18 and different numbers and sizes of holes can be included along the length of the tubes to provide even distribution. FIGS. 9 and 10 show one embodiment of an air distribution tube 100 according to the present invention comprising an outer tube 102 and an inner tube 104. The inner and outer tubes 104, 102 can be made of many different materials such as known polymer materials.

Outer tube holes 106 are provided in the outer tube 102, and inner tube holes 108 are included in the inner tube 104.

By changing the pattern of the outer tube holes 106, the inner tube holes 108, or both, different amounts of air are allowed to pass out of the tube 102 at different locations along the tube 102. In different embodiments the pattern of holes can vary in different ways along the length of the tube 102 to compensate for pressure variations, with the appropriate pattern can be determined during design of the air distribution system and greenhouse arrangement.

In one embodiment according to the present invention, the first outer tube section 110 can have holes 110a that are further apart compared to other tube sections, with section 110 corresponding to a tube section with higher pressure passing through it. By having holes further apart, less air passes from the tube in section 110, allowing for a more equal distribution of air along all the sections of the tube. The holes can be changed in other ways to compensate for different pressures along the tube. The second outer tube section 112 can also have second tube holes 112a that are larger than the holes in other sections. Second tube section 112 can correspond to a tube section with lower pressure, with the larger holes allowing more air out in those sections, to equalize the air exiting along the outer tube 102. Different size and spacing arrangements can be provided along the length of the tube, and although the holes are shown in outer tube 102 as being in straight line, it is understood that the holes can be provided in many different arrangements such as staggered, wavy, zigzag, random, etc. The changes in the hole size and arrangement are shown in outer tube 102, but it is understood that the holes can also be varied in the inner tube 104, or in both the outer tube 102 and inner tube 104.

For tube 100, the inner tube 104 can have a smaller diameter than the outer tube 102, at least along some sections of the tube. In the embodiment shown the outer tube 102 has a diameter that varies slightly along its length between a diameter that is the same as the inner tube 104 and a diameter that is slightly larger than the inner tube 104. In some embodiments where the inner tube 104 and outer tube 102 have the same diameter, the two can be bonded together, although in other embodiments the two may not bonded together. In still other embodiments the inner tube 104 can have a diameter that varies within the other tube to form the compartments. In all these embodiments, compartments 114 are formed between the inner tube 102 and the outer tube 104, and in the embodiment shown, multiple compartments 114 are formed along the length of the tube 100. It is understood, however, that other embodiments can have larger or smaller compartments and can also be arranged with a single compartment along the length of the tube 100, between the inner tube 104 and outer tube 102.

The compartments 114 encourage air exiting the tube 100 without being influenced by the direction of the main air flow or turbulence within the tube 100. As best shown in FIG. 10, the main air flow from the inner tube 102 passes through the inner tube holes 108 into the compartments 114. The inner tube holes 104 are offset from the outer tube holes 102 such that much of the turbulence or directional nature of the air flow is dissipated in the compartments 114 before exiting from the tube 100 through outer tube holes 106. This allows the air to exit the tube in a direction that is substantially perpendicular to the tube 100. This allows for controlled dissipation of air from the tube 100 so that it enters the greenhouse at the desired location.

In some applications it may also be desirable to reduce the effects of the temperature difference between the man air flow within the tube 100 and the temperature of the air within the greenhouse. The compartments 114 along with the offset of the outer holes 106 and inner holes 108 and compartments 114, provides for a double walled buffer zone that acts as an insulating barrier between the main air flow and the greenhouse. This arrangement of compartments 114 concentrates heat loss in air flow within the double walled buffer zone before the air is blown into the greenhouse environment. This helps equalize the temperature of the air entering the greenhouse from the tube 100, even with a substantial difference in temperature between the main air flow and the greenhouse.

The inner and outer tube arrangement of tube 100 also provides the advantage of having no barriers or restrictions in the inner tube 104 to equalize pressure along the tube 100. This results in an air distribution system that can consumes less energy in distributing air compared to systems having tubes with restrictions.

Figures 11, 12:
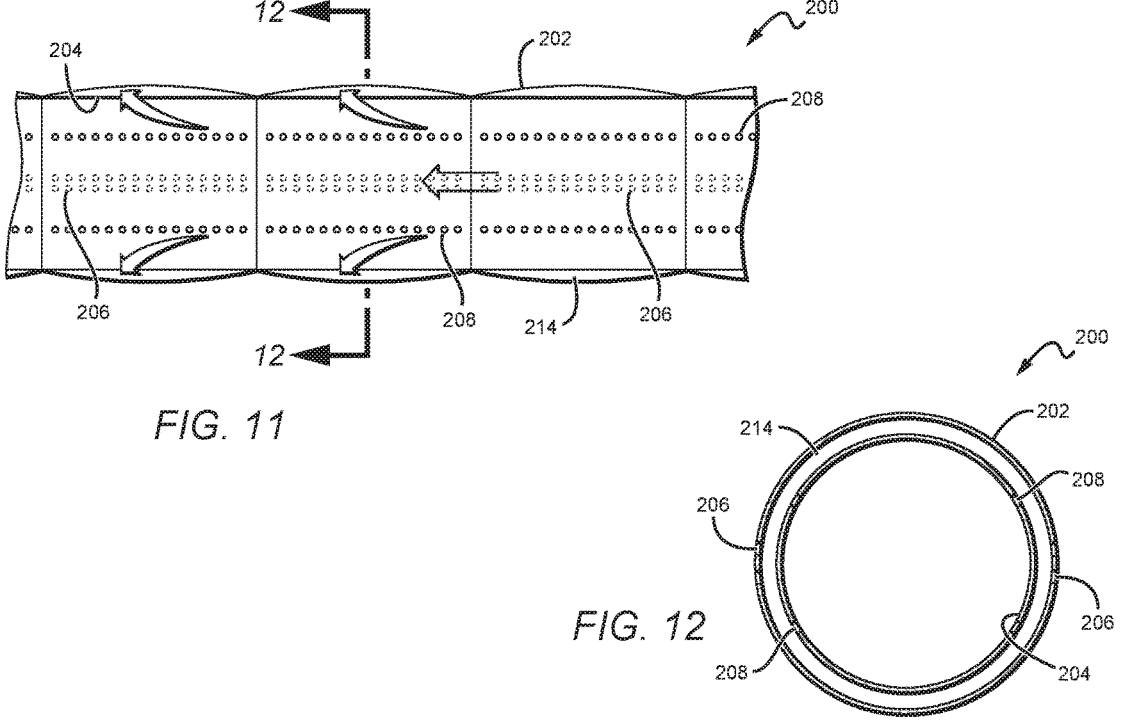
FIG. 11 is side view of another embodiment of an air distribution tube according to the present invention.
FIG. 12 is a sectional view of the tube in FIG. 11 taken along section lines 12-12.

FIGS. 11 and 12 show another embodiment of an air distribution tube 200 according to the present invention, also having an outer tube 202 and an inner tube 204 that can be arranged similar to those in tube 100 described above. The tube also comprises outer tube holes 206 and inner tube holes 208 that can have varying distances between adjacent holes and can have different sizes as discussed above to compensate for different air pressures and turbulence within the main air flow of the tube 200. The tube 200 can also have compartments 214 that also allow air to exit the tube 200 without being influenced by the direction of the main air flow within the tube 200. The compartment can also be arranged to reduce the effects of the temperature difference between the man air flow within the tube 200 and the temperature of the air within the greenhouse as described above.

As mentioned above, the outer tube holes 206 and inner tube holes 208 can have many different offsets, with the offsets in tube 200 being different from those in tube 100. The inner tube holes 208 are equally spaced around the circumference of the inner tube 204 and the outer tube holes 206 arranged on opposite sides of the outer tube 202. It is understood that the holes in the inner and outer tubes can be offset in many different ways beyond those shown in tube 100 and 200.

Although the present invention has been described in detail with reference to certain preferred configurations thereof, other versions are possible. Therefore, the spirit and scope of the invention should not be limited to the versions described above.

We claim:

1. A greenhouse, comprising:

a growing section; and an air or gas distribution system within said growing section, said distribution system comprising one or more conduits for distributing air or gas within said greenhouse with the one or more conduits carrying air or gas having different pressures along the length of the one or more conduits, the one or more conduits being arranged to provide substantially equal air distribution of air or gas throughout the growing section, each of said conduits comprising a conduit pair comprising an inner conduit within and surrounded by a respective outer conduit;

with a main air flow entering said growing section from said distribution system by passing said main air flow into said conduits, said inner conduit comprising inner conduit holes to allow said main air flow within said conduits to pass from within said inner conduit, and said outer conduit comprising outer conduit holes each of which are fully offset from all each of said inner conduit holes in its respective conduit pair, said outer conduit holes configured to allow air passing from said inner conduit to pass into said growing section, the pattern of the outer conduit holes changing along the length of the outer conduit so that different amounts of air are allowed to pass out of said outer conduit at different locations along said outer conduit to compensate for pressure variations;

one or more compartments are formed between each of said inner conduits and its respective outer conduit, wherein said main air flow from said inner conduit passes though the inner conduit holes into the one or more compartments;

wherein said inner and outer conduit holes are configured to compensate for substantially all of a turbulence or a directional flow of said main air flow within said conduits by dissipating much of the turbulence or directional flow of the main air flow in said one or more compartments before exiting through the outer conduit holes, to provide substantially equal distribution of air or gas throughout said growing section.

2. The greenhouse of claim 1, wherein said conduits are arranged to compensate for the temperature differential between said main air flow and said growing section.

3. The greenhouse of claim 1, wherein the amount of air exiting said conduits varies along the length of said conduits to compensate for turbulence or pressure differences within said conduits.

4. The greenhouse of claim 1, wherein the distance between said inner and outer conduit holes along said conduits is varied to compensate for turbulence or pressure differences within said conduits.

5. The greenhouse of claim 1, wherein the size of said holes is varied along said conduits to compensate for turbulence or pressure differences within said conduits.

6. The greenhouse of claim 1, comprising a plurality of said compartments in each conduit pair.

7. The greenhouse of claim 1, comprising a plurality of compartments in each conduit pair to reduce directional forces on air exiting said conduits.

8. The greenhouse of claim 7, wherein said compartments are arranged to compensate for the temperature differential between said main air flow and said growing section.

9. The greenhouse of claim 1, wherein each of said inner conduits is coaxial with its respective outer conduit.

10. The greenhouse of claim 1, wherein each of said inner conduits and each of said outer conduits has a substantially constant diameter.

11. The greenhouse of claim 4, wherein the distance between said inner conduit holes and the distance between said outer conduit holes increases as distance from an inlet of said inner and outer conduits increases.

12. A greenhouse air distribution system, comprising:

a plurality of inner conduits and outer conduits forming air distribution conduits to distribute air within a greenhouse, wherein each of said air distribution conduits comprises one of said inner conduits within and surrounded by a respective one of said outer conduits, with two or more compartments formed between said inner and outer conduits; and a system for providing a main air flow to the interior of said inner conduits, the air pressure within each of said inner conduits varying along its length, said inner conduits comprising inner conduit holes to allow air to pass from within said inner conduits, and said outer conduits comprising outer conduit holes, wherein said outer conduit holes allow for air passing from said inner conduits to pass into said greenhouse and wherein the pattern of the outer tube holes varying along the length of the outer conduit so that different amounts of air are allowed to pass out of the outer conduit at different locations along the outer tube to compensate for pressure variations along the length of said outer conduit, wherein each of said inner conduit holes is offset from all outer conduit holes in each of said air distribution conduits, wherein said inner and outer conduit holes are configured to compensate for a directional flow of said main air flow by dissipating substantially all of a directional nature of the main air flow in said one or more compartments before exiting through the outer tube holes to allow said air distribution conduits to provide for a substantially uniform air distribution along their lengths.

13. The system of claim 12, wherein said conduits have interior compartments.

14. The system of claim 12, wherein the pattern or size of said inner or outer conduit holes vary to compensate for pressure variations.

15. The system of claim 12, wherein said conduits are arranged to compensate for a temperature differential between said main air flow and said greenhouse.

16. The system of claim 12, comprising a plurality of compartments between said inner and outer conduits.

17. The system of claim 12, wherein each of said inner conduits is coaxial with its respective outer conduit.

18. A greenhouse, comprising:

a growing section;

a climate control system comprising a substantially enclosed end portion adjacent to and outside said growing section, said end portion comprising one or more vents and one or more mechanisms selectively moveable to cooperate with said one or more vents to control air flow through said one or more vents; and an air or gas distribution system within said growing section, said distribution system comprising one or more air distribution conduits for distributing air or gas within said greenhouse;

wherein said air distribution conduits run along the floor of growing section and each air distribution conduit comprises an inner conduit within and coaxial with a respective outer conduit, and one or more compartments between each of said inner conduits and its respective outer conduit;

said air distribution conduits carrying air or gas having different pressures along their length, with a main air flow entering said growing section from said distribution system passing into said air distribution conduits, said inner conduit of each of said air distribution conduits comprising inner conduit holes to allow said main air flow within said conduits to pass from within said inner conduit, and said outer conduit of each of said air distribution conduits comprising outer conduit holes that allow air passing from its said inner conduit to pass into said growing section, wherein each of said inner conduit holes is fully offset from each of said outer conduit holes, and wherein said inner conduit holes or outer conduit holes has a varying pattern;

wherein said inner and outer conduit holes in each of said air distribution conduits and said one or more compartments are configured to compensate for a directional flow of said main air flow within said conduits flow by dissipating substantially all of the directional a directional nature a turbulence of the main air flow before exiting through the outer tube holes to provide substantially equal distribution of air or gas throughout said growing section.

* * * * *